March 30, 1926. 1,578,279
G. H. GIBSON
MEASURING AND CONTROL APPARATUS
Filed Jan. 3, 1920 3 Sheets-Sheet 1

Patented Mar. 30, 1926.

1,578,279

UNITED STATES PATENT OFFICE.

GEORGE HERBERT GIBSON, OF MONTCLAIR, NEW JERSEY.

MEASURING AND CONTROL APPARATUS.

Application filed January 3, 1920. Serial No. 349,303.

*To all whom it may concern:*

Be it known that I, GEORGE H. GIBSON, citizen of the United States, and a resident of Montclair, in the county of Essex and State of New Jersey, have invented certain new and useful Measuring and Control Apparatus, of which the following is a specification.

My present invention comprises improvements in measuring apparatus, especially devised for use in measuring and controlling fluid rates of flow, though certain features of the invention are well adapted for widely different uses.

One main object of the invention is to provide improved mechanism for automatically maintaining a predetermined ratio between two fluid rates of flow. Another main object of the invention is to provide an improved form of relay mechanism for actuation or control by a delicate device, such as the needle of a sensitive galvanometer, and capable of exerting power impulses in response to such actuation or control, far greater than can be directly imparted by the delicate device. A third important object of my invention is to provide an improved form of electromagnetic flow balance for measuring a fluid rate of control.

The various features of novelty which characterize my invention are pointed out with particularity in the claims annexed to and forming a part of this specification. For a better understanding of the invention, however, and of the advantages possessed by it, reference should be had to the accompanying drawings and descriptive matter, in which I have illustrated and described preferred embodiments of the invention.

Figure 1:
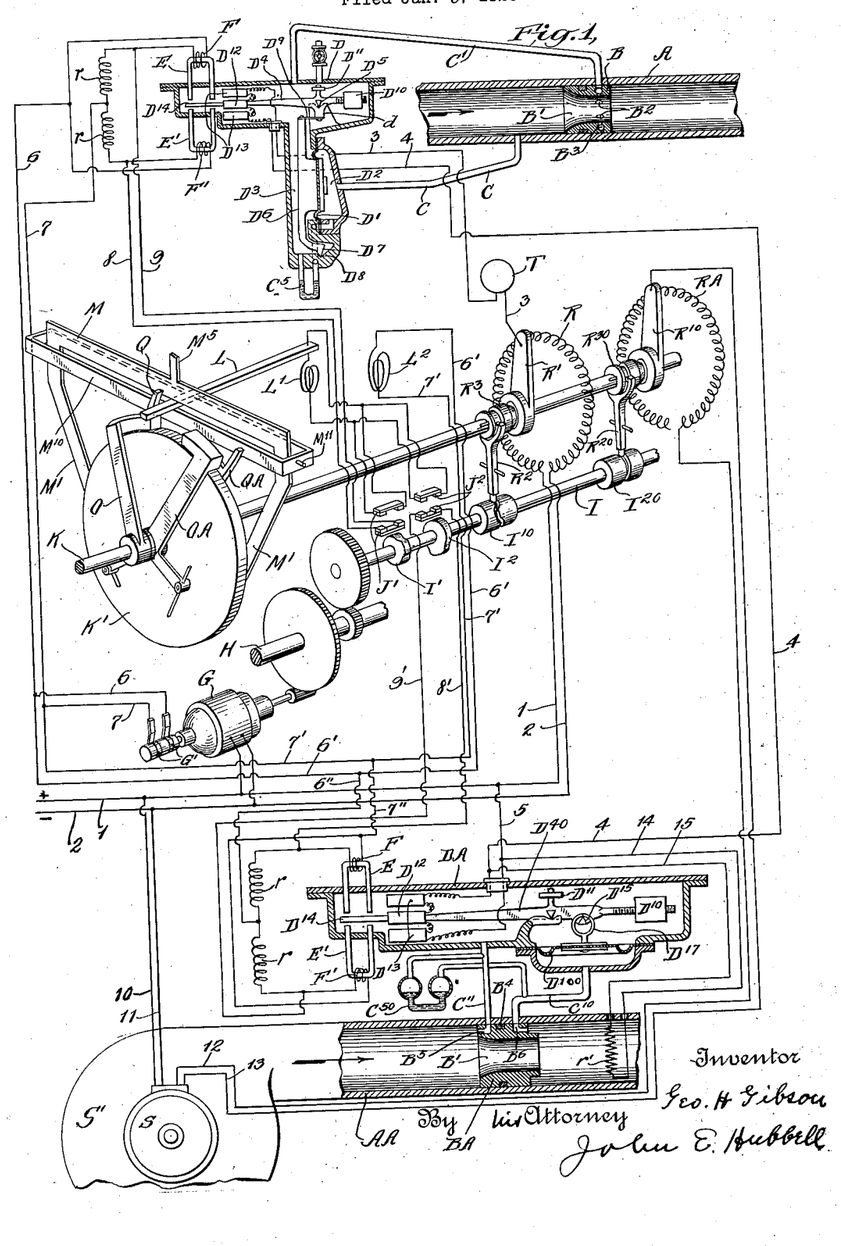
Fig. 1 is a diagrammatic representation, with parts broken away and in section, of apparatus for automatically measuring and maintaining a predetermined ratio between two fluid rates of flow.

The apparatus shown diagrammatically in Fig. 1 comprises two conduits A and AA, electromagnetic flow balances, D and DA, responsive to the fluid rates of flow through the conduits A and AA, respectively, a device S regulating the flow through the conduit AA, and an automatic controller for adjusting the electric energizing current through the balance D and for adjusting the flow regulator S as required to keep said electric current and the flow through the conduit AA, each proportional to the flow through the conduit A.

The flow balance D, in the preferred construction illustrated, comprises a diaphragm $D'$ separating chambers $D^2$ and $D^3$, and operatively connected to a main balance lever $D^4$. The latter carries a knife edge trunnion pivot $D^5$ resting on the bearing $d$. The bearing $d$ (see Fig. 5) comprises two integrally connected arms $d'$ faced off to a plane surface on their pivot engaging side, and two arms $d^2$ integrally connected to one another and detachably secured to the arms $d'$, and having their bearing forming faces parts of a plane surface which intersects the plane surface with which the bearing forming faces of the two arms $d'$ coincide. The bearing for one end of the knife edge pivot D is formed by one arm $d'$ and the adjacent arm $d^2$, while the other arms $d'$ and $d^2$ form the bearing for the other end of the pivot. With the described construction, the integrally connected arms $d'$ can readily be machined to give them their common plane faces, and the same is true of the arms $d^2$ so that the construction of very accurately formed bearings for the two ends of the knife edge pivot $D^5$ is a relatively simple and inexpensive proceeding.

Diaphragm $D'$ has its central portion connected to a lever $D^6$ which has at its lower end a knife edge $D^7$ resting on a suitable bearing $D^8$, preferably so located that the pivotal axis of the lever lies in the plane of the central portion of the diaphragm $D'$. The opposite end of the lever $D^6$ is connected to the lever $D^4$ by a flexible metal strip $D^9$. The main balance lever $D^4$ carries two adjustable weights, one $D^{11}$ adjustable along a line perpendicular to the bearing edge of the pivot $D^5$ and vertically disposed when the lever $D'$ is in its neutral position, while the other weight $D^{10}$ is adjustable along a line transverse to the line of adjustment of the weight $D^{11}$. The lever $D^4$ carries a coil $D^{12}$ connected in series with two stationary coils $D^{13}$ and co-operating with the latter just as do the movable and fixed coils of an ordinary Kelvin balance. The lever $D^4$ also carries an armature portion $D^{14}$ normally occupying a neutral position midway between the polar ends of the horse-shoe shaped cores of a pair of electromagnets $E$ and $E'$.

The chambers $D^2$ and $D^3$ are so connected to the conduit $A$ that the differential pressure acting on the diaphragm $D'$ will be proportional to the velocity, or more accurately, to the square of the velocity in the conduit $A$. In the particular arrangement shown for this purpose, the static pressure in a portion of the conduit $A$ of relatively large diameter is transmitted to the chamber $D^2$ by a conduit $C$, while the static pressure in a more restricted portion of the conduit $A$ is transmitted to the chamber $D^3$ by a conduit $C'$. The more restricted portion of the conduit $A$ is formed, as shown, by a bushing $B$ inserted in the conduit. The bore of the bushing $B$ comprises a flared or tapered entrance end $B'$, and a cylindrical body portion. Radial ports $B^2$ connect the interior of the latter to an annular pressure chamber $B^3$ into which the conduit $C'$ is connected.

To limit the maximum differential pressure impressed on the diaphragm $D'$ I employ a safety relief device in the form of a U tube $C^5$ containing a suitable sealing liquid, as mercury. One leg of the tube $C^5$ is connected to the chamber $D^2$ and the other to the chamber $D^3$. With this arrangement, when the differential pressure becomes excessive the mercury is forced out of the leg of the tube connected to the chamber $D^2$ and the U tube then forms a pressure equalizing connection between the chambers $D^2$ and $D^3$. This limits the maximum differential pressure on the diaphragm to a pressure equal to the hydrostatic pressure at the bottom of one leg of the U tube $C^5$ when all the mercury is in the leg.

The torque exerted on the main balance lever $D^4$ by the diaphragm $D'$ is normally balanced by the action of the stationary coils $D^{13}$ and movable coil $D^{12}$, and the energizing current for these coils is periodically adjusted as required to maintain the balance by an automatic control mechanism. The latter comprises a motor $G$ which runs continuously while the apparatus is in operation. The shaft of the latter is connected by speed reducing gears to a counter shaft $H$. The latter drives, through speed reducing gears, a cam shaft $I$ which carries cams $I'$ and $I^2$ for closing circuit controlling switches $J'$ and $J^2$, respectively. The cam shaft $I$ also carries a cam $I^{10}$ operating, through a lever $R^2$ and clutch member $R^3$, to lock a potentiometer switch arm $R'$ to a shaft $K$ during each interval in which the switch $J'$ is closed. Similarly the cam shaft $I$ carries a cam $I^{20}$ which operates through a lever $R^{20}$ to lock a rheostat switch arm $R^{10}$ to the shaft $K$ during the intervals in which the switch $J^2$ is closed.

The shaft $K$ is rotated in one direction or another, from time to time, by mechanism actuated by the motor $G$ and directly controlled by the position of the arm $L$ of a galvanometer of which $L'$ is the armature winding and $L^2$ the field winding. The mechanism shown in Figs. 1, 2, and 3 for this purpose comprises a clutch disk $K'$ secured to the shaft $K$, and two clutch carrying levers $O$ and $OA$ mounted on the shaft $K$ with freedom to turn about the latter and oscillated simultaneously but in opposite directions on each rotation of the shaft $H$. For this purpose the shaft $H$ carries a crank disk $N$ with a crank pin $N'$ working in a slot $N^2$ in a sort of Scotch yoke member $N^3$ which is connected to the lever member $O$ at one end, and at the other end has a tail piece $N^8$ working between a pair of guide pins $N^9$. A member $N^6$ has one end connected by a pivot pin $N^5$ to the member $N^3$ adjacent the slot $N^2$, and has its other end connected to the lever $OA$. The pivotal connection between the lever $O$ and member $N^3$ is on the opposite side of the shaft $K$ from the pivotal connection between the lever $OA$ and member $N^6$. In consequence the rotation of the crank pin $N'$ causes an up and down movement of the part $N^3$ during which the tail piece $N^8$ slides back and forth between the guide pins $N^9$, while the upper end of the member $N^3$, owing to its connection with the lever $O$, oscillates the latter and is itself caused to swing in an arc about the axis of the shaft $K$. The general up and down movement of the member $N^3$ which thus oscillates the lever $O$, also oscillates the lever $OA$ through the member $N^6$, but it will be apparent that the levers $O$ and $OA$ are oscillated in opposite directions. With the arrangement shown, while the movement of the pivot pin $N^5$ is not truly radial to the shaft $K$, the variation is so slight that with a symmetrical arrangement of the levers $O$ and $OA$ and their connections to the pin $N^5$, the movements imparted to the levers O and OA are practically equal. Advantageously, as shown, the cam slot $N^2$ is curved so that the final portions of the movements of approach and the corresponding portions of the return movements of the levers O and OA are more rapid than the other portions of their movements. Preferably the operating connections between members $N^3$ and O and between members $N^6$ and OA include springs $N^4$ and $N^7$, respectively, serving as safety relief devices in case faulty operation of the clutch mechanism hereinafter described results in locking both levers O and OA to the disk $K'$ at the same time.

Figures 2, 3, 4, 5, 6, 7:
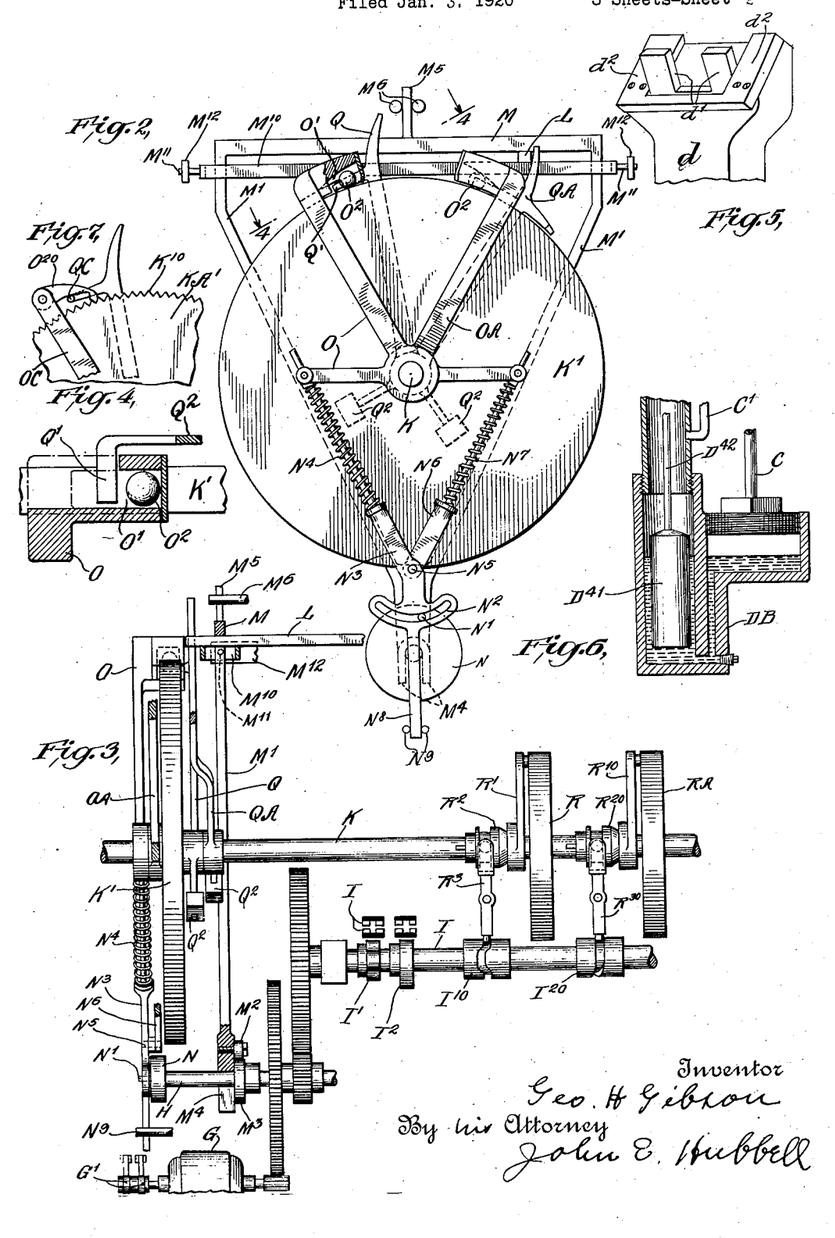
Fig. 2 is an elevation of a portion of the apparatus shown in Fig. 1.
Fig. 3 is an elevation, partly in section, taken at right angles to Fig. 2.
Fig. 4 is a section on the line 4—4 of Fig. 2.
Fig. 5 is a perspective view of a knife edge bearing employed in the apparatus shown in Fig. 1.
Fig. 6 is a sectional elevation illustrating a modified form of differential pressure balance.
Fig. 7 is an elevation of a modification of the shaft rotating apparatus shown in Fig. 1.

The levers O and OA each comprise a portion overlying the periphery of the disk $K'$ and formed with a race way $O'$ for a clutch ball $O^2$. The roof of each race way $O'$ is inclined (see Fig. 2) so that the corresponding clutch ball $O^2$ tends to wedge between it the disk $K'$ and thus lock the corresponding member O or OA to the disk $K'$ on the movement of these members toward one another. A weighted lever Q journalled on the shaft K has a finger $Q'$ which is held against the clutch ball $O^2$ carried by the lever O, by a weight $Q^2$, and thereby normally prevents the ball from locking the lever O to the disk $K'$ so long as the lever Q is permitted to turn under the action of its weight $Q^2$ with the lever O. A similar clutch ball engaging lever QA is associated with the lever OA. The parts are so proportioned that with the galvanometer arm L in its neutral position when the levers O and OA are moved toward one another neither lever will be clutched to the disk $K'$. With the arm L to the right of its neutral position, as shown in Fig. 2, however, it engages the arm QA and prevents the latter from sharing in a final portion of the movement of the lever OA, and thereby causes the latter to be locked to the disk $K'$ by the corresponding ball $O'$. Similarly with the arm L to the left of its neutral position, the lever O will be locked for a portion of its movement to the disk $K'$.

To enable the galvanometer arm L to stop the levers Q and QA when engaged by the latter, the arm L is clamped between a movable yoke or beam M and an abutment member $M^{10}$ during the major final portion of the movement of approach of the levers O and OA. The yoke M comprises arms $M'$ which straddle the shaft K and are connected at their lower ends where they carry a roller $M^2$ riding on a cam $M^3$ carried by the shaft H. They also have guide portions $M^4$ which straddle the shaft H and a guide portion $M^5$ which passes between stationary guides $M^6$. The abutment $M^{10}$ is swivelled by trunnion pivots $M^{11}$ to stationary supports $M^{12}$. As the cam $M^3$ rotates, it alternatively lifts the roller $M^2$ and thereby the yoke M, permitting the arm L to swing freely between the yoke M and abutment $M^{10}$, and then permits the yoke M to drop back under the action of gravity and thereby clamp the arm L against the abutment $M^{10}$.

The electromagnetic flow balance DA associated with the conduit AA is of the same general character as the flow balance D already described. The flexible diaphragm $D^{100}$ of the balance DA is horizontal and is provided with bearing rings $D^{17}$ on its upper side which engages the knife edge pivot $D^{15}$ carried by the main balance lever $D^{40}$ which, except in the manner of its connection to its actuating diaphragm is identical in construction with the lever $D^4$. A flow measuring pressure differential is created in the conduit AA by means of a bushing BA, having a central passage with a flared end $B'$ and cylindrical body portion like the bushing B already described. The forward end of the bushing BA is externally reduced in diameter to provide an annular channel between it and the wall of the conduit AA, and a pressure transmitting pipe $C^{10}$ leads from this channel to the chamber of the balance DA beneath the diaphragm $D^{100}$. The chamber above the diaphragm $D^{100}$ is connected by a pressure transmitting pipe $C^{11}$ to a passage formed in the bushing. $C^{50}$ represents a U tube safety device containing a sealing liquid as mercury which is connected between the pipes $C^{10}$ and $C^{11}$ and functions like the U tube $C^5$ of the balance D.

The apparatus shown in Fig. 1 is intended to maintain a predetermined ratio between the rate of flow of a fluid, for instance boiler feed water or steam through the conduit A, and the rate of flow of a gaseous fluid, as air supplied to a furnace, through the conduit AA, by varying the rate of flow of air in automatical response to variations in the flow through the conduit A. The flow through the conduit A is thus an independent variable, and the flow through the conduit AA is directly controlled by regulating the speed of the electrical motor S operating a fan or blower which creates the flow through the conduit AA. As shown, the motor S is shunt wound and its field winding is connected by conductors 12 and 13, in series with more or less of the resistance RA, depending upon the position of the switch arm $R^{16}$. The armature winding of the motor S is connected by leads 10 and 11 to the electrical main supply conductors 1 and 2. The terminals of a potentiometer resistance R are connected between the supply conductors 1 and 2. The balance coils $D^{12}$ and $D^{13}$ are connected in series with more or less of the potentiometer resistance R, depending upon the setting of the potentiometer switch $R'$ by circuit connections comprising a conductor 3 connecting the switch R' to one terminal of coils $D^{12}$ and $D^{13}$ of the balance D, and a conductor 4 connecting the other terminal of those coils to one terminal of the coils $D^{12}$ and $D^{13}$ of the balance DA. The other terminal of the last mentioned coils is connected by a conductor 5 to the supply conductor 1. With this arrangement the energizing current for the coils $D^{12}$ and $D^{13}$ of the balance D (as also for the corresponding coils of the balance DA) will be increased by an angular adjustment by the switch R' in the clockwise direction, and will be diminished by a rotation of the arm R' in the opposite direction.

The windings F and F' of the electromagnet E and E' of the balance D are connected in a closed circuit forming a Wheatstone bridge of which the windings F and F' form adjacent arms and the other two arms are formed by two equal resistances $r$. The Wheatstone bridge is energized by current supplied by conductors 6 and 7, the first being connected to the bridge between the arms F and F', and the other between the two arms $r$, and receiving current from brushes bearing on slip rings G' connected to the armature winding of the motor G which thus supplies alternating current to the Wheatstone bridge, although in the particular arrangement shown, the supply conductors, 1 and 2, form part of a direct current system. A conductor 8 is connected at one end to the Wheatstone bridge of the balance D between the arm containing the winding F', and the adjacent resistance arm $r$, and is connected at its opposite end to one terminal of the switch J'. A second terminal of switch J' is connected by a conductor 9 to the Wheatstone bridge between the winding F' and the adjacent resistance arm $r$. The other two terminals of the switch J' are connected to the terminals of the armature winding L' of the galvanometer so that when the switch J' is closed by the cam I', the armature winding of the galvanometer is connected by the conductors 8 and 9 to the corresponding points of the Wheatstone bridge of the balance D. The galvanometer field winding $L^2$ is connected between the conductors 6 and 7 by branch conductors 6' and 7'.

The coils F and F' of the balance DA, form arms of a Wheatstone bridge, of which the other two arms are resistances $r$, and which is like the Wheatstone bridge described in connection with the balance D. This Wheatstone bridge of the balance DA is energized from the conductors 6 and 7 by branch conductors 6', 6'', 7', and 7''. The Wheatstone bridge of the balance DA is connected by conductors 8' and 9' to two terminals of the switch $J^2$ just as the Wheatstone bridge of the balance D is connected to two terminals of the switch J'. The other pair of terminals of the switch $J^2$ are connected to the armature winding L' of the galvanometer so that when the switch $J^2$ is closed (the switch J' then being open) the armature winding L' is connected through switch $J^2$ and conductors 9' and 8' to diametrically opposed points of the Wheatstone bridge circuit of the balance DA.

To automatically compensate for variations between the rate of flow through the conduit AA and the resultant differential between the pressures transmitted to the balance DA which are produced by changes in air density resulting from changes in temperature of the air passing through the conduit AA, a suitable resistance $r'$ is located in the conduit AA and is connected in shunt to the coils $D^{12}$ and $D^{13}$ of the balance DA.

The effect of a rise in temperature in the air passing through the conduit AA is to decrease the density of the air. A consequence of this density change is, that for a given differential of pressure impressed on the diaphragm $D^{100}$, the weight rate of flow will be decreased by a decrease in the air density. The shunt resistance $r'$, if of such material that its electrical resistance will increase with the temperature of the air to which it is exposed, compensates more or less for the change of air density by diverting more of the balancing current measured by the galvanometer away from the coils $D^{12}$ and $D^{13}$ of the balance DA when the air is relatively cool than when it is relatively hot. By choosing for the resistance body $r'$, a material the resistance of which changes with its temperature at the proper rate, and by properly proportioning this resistance with respect to the resistance of coils $D^{12}$ and $D^{13}$, the compensation thus obtained may be made almost mathematically exact for ordinary ranges of temperature variations. The principles by which material for resistance body $r'$ is chosen and this resistance is proportioned to the coils $D^{12}$ and $D^{13}$ are fully explained in my co-pending application Serial No. 247,858, filed Aug. 1, 1918. It is sufficient to say herein that the desired result will be obtained in the present case, if the air density is expressed by the equation $$d = \frac{C}{\sqrt{1+Bt}}$$

wherein $d$ is the density at the temperature $t$, and C and B are constants, and if the resistance at any temperature $t$, of the resistance body $r'$ is expressed by the equation $R = Ro\,(1+Dt)$, wherein R represents the resistance at any temperature $t$, and $Ro$ and D are constants. With these assumptions the desired compensation will be obtained when $Ro$ is small with respect to the resistance of coils $D^{12}$ and $D^{13}$, and B is twice as large as D.

In operation the motor G is in constant rotation and the switches J' and J² are closed by the cams I' and I², in regular alternation. With the speed reducing gearing shown, the shaft H makes several rotations for each rotation of the camshaft I. Each rotation of the shaft H causes an oscillation of levers O and OA, and during the final portion of each movement of the levers O and OA, toward another, the galvanometer needle L is clamped between the crosshead M and the abutment M¹⁰. If the galvanometer arm L is in its neutral position when clamped against the abutment M¹⁰, the movement of the levers O and OA will not affect the position of the disc K'. If the arm L is to the right of the neutral position as seen in Figs. 1 and 2 when clamped between the parts M and M¹⁰, however, the weighted lever QA will then be prevented by the galvanometer arm L from sharing a final portion of the movement of the lever OA towards the lever O. When the movement of the lever QA is thus interrupted, the clutch ball O² of the clutch mechanism carried by the lever OA, will automatically lock the latter to the disc K' and thus give an angular adjustment to the shaft K, which will be proportional in extent, to the displacement of the galvanometer needle L from its neutral position. Similarly, when the galvanometer arm L is clamped between the members M and M¹⁰ while to the left of its neutral position as seen in Figs. 1 and 2, the weighted arm Q will be prevented from sharing a final portion of the movement of the arm O towards the arm OA, and the shaft K will then be given a corresponding angular adjustment in the clockwise direction.

When the switch J' is closed, the galvanometer winding L' is connected between points of the Wheatstone bridge of the balance D which are of the same potential when the armature D¹⁴ of the balance lever D⁴ is in its neutral position, as it will be if the current through the coils D¹² and D¹³ of the balance D is of the proper strength to balance the differential pressure action on the diaphragm D'. When the current is insufficient to maintain the lever D⁴ in its neutral position, the armature D¹⁴ will approach the core of the electromagnet E, thus increasing the inductance of the winding F and thereby causing a current to flow through the galvanometer winding L' which will swing the galvanometer arm L to the left as seen in Figs. 1 and 2. Angular movements of the lever O occurring while the arm L is to the left of its neutral position will cause the shaft K to be adjusted in the clockwise direction. This will shift the potentiometer switch arm R' in the clockwise direction and thereby increase the energizing current through the coils D¹² and D¹³ of the balance D, thus restoring or tending to restore the normal neutral position of the balance lever D⁴. When the current through the balance coils is too large, the armature D¹⁴ will move closer to the core of the electromagnet E', thus causing a current flow through the galvanometer winding L' which is 180° out of phase with the current produced when the armature approached the electromagnet E. This current will swing the galvanometer arm L to the right of its neutral position, whereupon the lever OA will cause the shaft K and the switch arm R' to be adjusted in the counter clockwise direction, thus reducing the current through the balancing coils D¹² and D¹³ of the balance D. The apparatus thus operates to maintain a balancing current through the coils D¹² and D¹³ of the balance D which is proportional to the fluid rate of flow through the conduit A, for the torque exerted on the lever D⁴ is proportional to the square of the intensity of the current through the coils D¹² and D¹³, and the counter torque exerted on the balance lever D⁴ by the diaphragm D' is proportional to a pressure differential which varies as does the square of the velocity of the flow through the conduit A. The fluid rate of flow through the conduit A may thus be measured directly by an ordinary ammeter T in series, as shown, with the coils D¹² and D¹³ of the balance D.

Since the current through the coils D¹² and D¹³ of the balance DA is the same as the current through the balance coils of the balance D and is adjusted solely to keep the lever D⁴ of the balance D in its neutral position, the armature D¹⁴ carried by the lever D⁴⁰ of the balance DA will be moved toward the core of the corresponding electromagnets E or E' accordingly as the flow through the conduit AA increases or decreases relatively to the flow through the conduit A. With the ratio of the flow through the conduit AA to the current through the coils D¹² and D¹³ above normal the galvanometer arm L will be shifted to the left when the cam I² closes the switch J² and the rheostat arm R¹⁰ will be correspondingly shifted in the clockwise direction. This will decrease the portion of the resistance RA in the shunt field winding of the motor S, and correspondingly decrease the speed of the motor S and the rate of flow through the conduit AA. When the ratio of the predetermined flow through the conduit AA to the balancing current through the balancing coils falls below the predetermined normal, the galvanometer arm L' swings to the right, and the switch arm R¹⁰ is adjusted in the clockwise direction, thus decreasing the field strength and increasing the speed of the motor S.

The apparatus shown in Figs. 1 to 5 possess numerous important practical advantages. The relay mechanism formed by the motor G and the apparatus by which it closes the switches J' and J'' and is intermittently clutched to the switch arms R' and R¹⁰ when the portion of the galvanometer arm L makes this desirable, is obviously simple, reliable, and effective. An important characteristic of this apparatus is that the extent of the adjustment of the switch arms R' and R¹⁰ brought about in any one adjusting operation, is proportional to the displacement of the galvanometer arm L at that instant. This obviously permits a large adjustment when a considerable adjustment is needed, and a smaller adjustment when a less adjustment is required and minimizes the tendency of the apparatus to "hunt". The use of the armature D¹⁴ and the electromagnet E and E' in the Wheatstone bridge arrangement shown is highly sensitive and reliable. It permits of an electric control without requiring switch contacts to be made and broken by the balance lever or without putting any special strain on the latter. The adjustable weight D¹⁰ on each balance lever forms a simple means of obtaining static balance of the apparatus while the vertical adjustment weight D'' forms an effective means of adjusting the sensitiveness of the apparatus.

It will be obvious, of course, to those skilled in the art, that many changes may be made in the form of the apparatus employed for carrying out my invention without departing from the appended claims. For example, in lieu of diaphragms employed in balance D and DA, other known forms of a differential pressure balance may be employed as for example such an arrangement as is shown in Fig. 6. In Fig. 6 a pressure chamber DB forming in effect a U tube containing a sealing liquid, as mercury, is employed, the pressure pipe C' being connected for example to one leg of the U tube, and the pressure pipe C to the other leg. With this arrangement, a float D⁴¹ in the one leg of the U tube is raised or lowered by changes in the level of the sealing liquid, and this float may be connected through its stem D⁴² to a balance lever D⁴, such as is employed in the apparatus shown in Fig. 1.

As another instance of formal variation which may be made in the apparatus disclosed in Figs. 1 to 5, I show in Fig. 7 an arrangement in which the disk KA' corresponding to the controller disk K' of Figs. 1, 2, and 3, is formed with ratchet teeth K¹⁰ at its periphery. In this construction the lever element OC corresponding to one of the lever members O and OA of Figs. 1, 2, and 3, is pivoted to a pawl O²⁰ which is normally held out of contact with the ratchet teeth K¹⁰ by the arm QC which may be identical with the corresponding arm Q or QA of the construction first described with the apparatus shown in Fig. 7, when the arm QC is prevented from sharing the movement of the arm OC, the pawl O²⁰ drops into engagement with the ratchet teeth K¹⁰ so that the disk KA' is then rotated with the arm OC.

Figure 8:
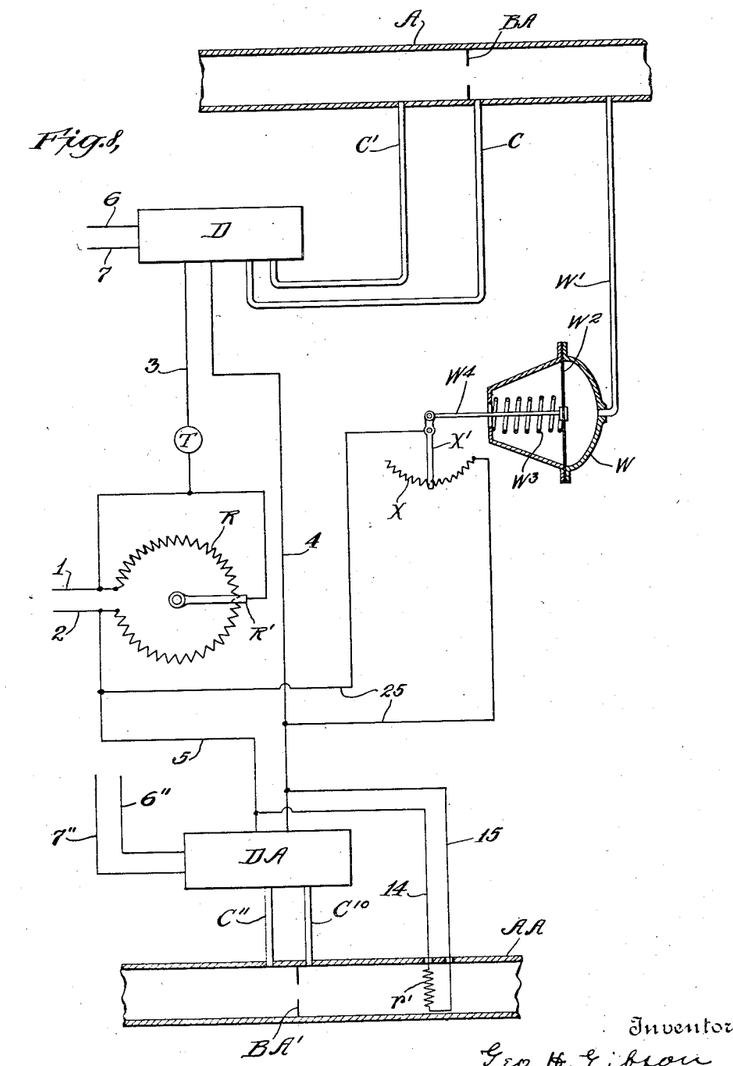
Fig. 8 is a diagram illustrating the incorporation in the apparatus of Fig. 1 of means responsive to the pressure of one of the fluids.

Fig. 8 is a diagram containing a simplified showing of a portion of the apparatus of Fig. 1. The special differential pressure creating device B and BA of Fig. 1 are replaced in Fig. 8 by simple restricted orifice members BA and BA' respectively, but aside from this, the apparatus shown in Fig. 8 differs from that shown in Fig. 1 only in the addition of a shunt 25 connected across the windings of the electro-magnetic motor of the balance DA.

The shunt 25 includes more or less of a variable resistance X accordingly as the static pressure in the conduit A falls below or rises above a predetermined value. To thus vary the amount of the resistance X in the shunt 25, I employ a fluid pressure motor W having a diaphragm W² subjected at one side to the static pressure in the conduit A which is transmitted to the motor W by the pipe W', and subjected at the other side to the opposing action of a spring W³. The diaphragm W² has its stem W⁴ connected to a pivoted switch arm X'. As the static pressure in the conduit A increases, the arm X' is moved to decrease the amount of the resistance X in the shunt 25, and as the static pressure in the conduit A decreases, the arm X' is adjusted to increase the amount of the resistance X in the shunt circuit.

With the arrangement shown in Fig. 8, the electric balancing current flowing through the windings of the balance D is maintained proportional to the fluid flow through the conduit A, and the ammeter T thus gives a correct indication, or record of the fluid flow through the conduit A. The effect of the shunt 25 with its resistance varied as above described in response to variations in the static pressure in the conduit A, is to vary the ratio between the fluid rate of flow in the conduits A and AA as the static pressure in the conduit A varies. This may be desired in various cases: for example, if the conduit A is the steam line from a steam generating boiler or the water feed line to the boiler, and the conduit AA supplies air to the boiler furnace necessary to support combustion therein, it will be desirable in some cases to make the amount of air supplied by the conduit AA generally proportional to the rate at which steam is generated in and withdrawn from the boiler, and in addition to diminish or increase the supply of air to the boiler furnace as the steam pressure in the boiler rises above or falls below a predetermined normal pressure. Such a double control of the supply of air in response both to the rate of steam generation and to the steam pressure may obviously be secured with the form of my invention illustrated in Fig. 8. Certain novel subject matter disclosed but not claimed herein is claimed in my divisional application Serial #656,765, filed August 10, 1923.

While in accordance with the statutes, I have illustrated and described the best form of embodiment of my invention now known to me, it will be apparent to those skilled in the art that changes may be made, in addition to those specifically suggested above, without departing from the spirit of my invention as set forth in the appended claims and that certain features of my invention may be used to advantage in such cases without a corresponding use of other features.

Having now described my invention, what I claim as new and desire to secure by Letters Patent is:

1. The combination with a measuring instrument comprising a swinging arm, of a relay mechanism comprising a pair of members automatically actuated to move toward and away from each other and from the neutral position of said arm and one or the other engaging said arm in such movement if the latter is displaced from its neutral position in one direction or the other, and mechanism adjusted in one direction on such engagement of the arm by one member and in the opposite direction when said arm is engaged by the other member.

2. The combination with a measuring instrument comprising a swinging arm, of a relay mechanism comprising a pair of members automatically actuated to move toward and away from each other and from the neutral position of said arm and one or the other engaging said arm in such movement if the latter is displaced from its neutral position in one direction or the other, and mechanism adjusted in one direction on such engagement of the arm by one member and in the opposite direction when said arm is engaged by the other member, the extent of each such adjustment being dependent on the displacement of the arm from its neutral position.

3. The combination with an instrument comprising a swinging arm, of a shaft parallel to said arm when the latter is in its neutral position, a pair of members journaled on said shaft, means for oscillating them simultaneously each towards and away from the neutral position of said arm, normally inoperative means for locking each of said members to said shaft and means dependent upon the position of said arm for locking one of the said members to the shaft during a clockwise movement of that member when said arm is displaced in one direction from its neutral position, and for locking the other member to the shaft during the counter clockwise movement of that member when said arm is displaced in the opposite direction from its neutral position.

4. The combination with an instrument comprising a swinging arm, of a relay mechanism comprising a shaft, a pair of members journaled on said shaft, means for oscillating said members about said shaft, and means controlled by the position of said arm for locking one of the said members to said shaft on a movement of that member in the counter clockwise direction when said arm is displaced in one direction from its neutral position, and when displaced in the opposite direction, for locking the other member to the shaft during the movement of the said other member in a clockwise direction.

5. In an electrical measuring and control system, the combination of a pair of electromagnetic flow balances, a relay mechanism, an electric motor for driving the later, a source of direct current for energizing said balances; an alterating current system including windings, the inductances of which are varied by displacements from their neutral positions of the flow balances and slip rings connected to the armature windings of said motor and to said alternating current system.

6. A control mechanism comprising in combination a meter having a swinging arm, means for connecting said meter successively in a plurality of electric circuits, a shaft, means for angularly adjusting said shaft each time the connection of the meter in one of said circuits results in a displacement of the meter arm from its neutral position, a plurality of control devices one for each of the said circuits, and means for operatively connecting said shaft to the corresponding control device each time the meter is connected in one of said circuits.

7. A control mechanism comprising in combination an electric meter having a swinging arm, a power rotated cam shaft, a plurality of electric circuits into which the meter is successively connected by said cam shaft, a second shaft means dependent upon the position of the meter arm for angularly adjusting said second shaft whenever the meter is connected into one of said circuits and the meter arm is thereby displaced, a plurality of control devices, one for each of the said circuits and each comprising an arm journaled on said second shaft and means actuated by said cam shaft for clutching said second shaft to the arm of the corresponding control device whenever the meter is connected into one of the said circuits.

8. A control mechanism comprising in combination an electric meter having a swinging arm, a power rotated cam shaft, a plurality of electric circuits into which the meter is successively connected by said cam shaft, a second shaft, means dependent upon the position of the meter for angularly adjusting said second shaft whenever the meter is connected to one of said circuits by an amount and in a direction depending upon the displacement of the meter arm, a plurality of control devices, one for each of the said circuits and each comprising an arm journaled on said second shaft, and means actuated by said cam shaft for clutching said second shaft to the arm of the corresponding control device whenever the meter is connected into one of the said circuits.

9. A control mechanism comprising in combination a meter having a swinging arm, means for connecting said meter successively in a plurality of electric circuits, a movable member, means for adjusting said member each time the connection of the meter in one of said circuits results in a displacement of the meter arm from its neutral position, a plurality of control devices one for each of said circuits and means for operatively connecting said member to the corresponding control device each time the meter is connected in one of said circuits.

10. The combination with a measuring instrument comprising an arm adapted to swing back and forth along a fixed path, means operating to intermittently clamp said arm in whatever position it may then occupy, and members movable toward and away from the neutral position of said arm and one or the other engaging said arm in such movement when the latter is clamped in any position other than its neutral position, and mechanism adjusted in one direction on such engagement of the arm by one member and in the opposite direction when said arm is engaged by the other member.

Signed at Philadelphia in the county of Philadelphia and State of Pennsylvania, this 31st day of December A. D. 1919.

GEORGE HERBERT GIBSON.